US007176949B1

United States Patent
Moser

(10) Patent No.: US 7,176,949 B1
(45) Date of Patent: Feb. 13, 2007

(54) SYSTEM, METHOD AND ARTICLE OF MANUFACTURE FOR AN INCREMENTAL EXPLANATORY OBJECT IN A LEARNING APPLICATION ASSEMBLY FRAMEWORK

(76) Inventor: Albert N. Moser, 1798 Vassar Ave., Mountain View, CA (US) 94043

( * ) Notice: Subject to any disclaimer, the term of this patent is extended or adjusted under 35 U.S.C. 154(b) by 0 days.

(21) Appl. No.: 09/441,930

(22) Filed: Nov. 17, 1999

(51) Int. Cl.
G06F 3/00 (2006.01)

(52) U.S. Cl. .................. 345/705; 345/709; 345/762; 345/780; 434/322

(58) Field of Classification Search ......... 345/705–715, 345/730–731, 762, 780, 967; 434/322, 323, 434/350
See application file for complete search history.

(56) References Cited

U.S. PATENT DOCUMENTS

| 4,793,813 | A | | 12/1988 | Bitzer et al. | |
|---|---|---|---|---|---|
| 5,122,062 | A | * | 6/1992 | Cutler et al. | 434/327 |
| 5,211,563 | A | | 5/1993 | Haga et al. | |
| 5,310,349 | A | | 5/1994 | Daniels et al. | |
| 5,458,494 | A | | 10/1995 | Krohn et al. | |
| 5,522,732 | A | * | 6/1996 | Roberts et al. | 281/15.1 |
| 5,539,869 | A | * | 7/1996 | Spoto et al. | 345/707 |
| 5,586,218 | A | | 12/1996 | Allen | |
| 5,715,415 | A | * | 2/1998 | Dazey et al. | 345/708 |
| 5,727,950 | A | | 3/1998 | Cook et al. | |
| 5,820,386 | A | | 10/1998 | Sheppard, II | |
| 5,890,911 | A | * | 4/1999 | Griswold et al. | 434/322 |
| 5,967,793 | A | | 10/1999 | Ho et al. | |
| 5,982,365 | A | * | 11/1999 | Garcia et al. | 345/705 |
| 5,995,101 | A | * | 11/1999 | Clark et al. | 345/711 |
| 6,014,134 | A | * | 1/2000 | Bell et al. | 345/705 |
| 6,023,692 | A | * | 2/2000 | Nichols | 706/14 |
| 6,064,978 | A | * | 5/2000 | Gardner et al. | 434/322 |
| 6,259,890 | B1 | * | 7/2001 | Driscoll et al. | 434/118 |
| 6,361,326 | B1 | * | 3/2002 | Fontana et al. | 434/236 |

* cited by examiner

Primary Examiner—Kristine Kincaid
Assistant Examiner—Sy D. Luu

(57) ABSTRACT

A system, method and article of manufacture are provided for generating an incremental explanatory object in an educational application program, First, at least one interface is provided including a plurality of fields. Educational textual information is then entered via the interface for entry into the fields. During operation, the user is permitted to select an incremental explanatory icon on the interface. Upon the selection of the incremental explanatory icon, a plurality of sequential fields are shown. Thereafter, the user is prompted to enter educational textual information for entry into the sequential fields. The received textual information is subsequently compiled in an executable educational application program.

15 Claims, 15 Drawing Sheets

● How To Use This Course

Learning is straightforward and easy when taking this course. All you need to know to get started are the following simple steps.

Click Here  to continue.

Course Structure

This course is divided into chapters listed on the left sidebar. This self-paced tutorial is designed to be studied in a linear fashion, but at any time you can jump to another chapter. At the beginning of each chapter is a summary of what you will learn in the chapter and a list of the chapter subjects. While we suggest that you read the chapter subjects in order, you can click a subject title to jump directly to that subject page.

On the subject pages, you will find icons that you can click to access additional information.

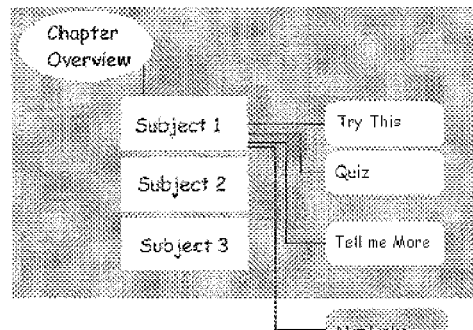

 Link to an in-depth article on the subject

 Link to an interactive feature about the subject

 Link to recommended resources on the Internet related to the subject

 Link to questions designed to provide you with a better understanding of the information you just learned. To obtain the answer to each question, move your mouse over the text in the answer icon. The icon changes to reveal the answer.

 Link to a test page where you can measure your understanding of the material

Figure 9A

 Link to a visual guide that provides a detailed explanation of how to use a particular tool

Services Bar
The course may have a services bar that contains one or more of the following features. To access any of these features, simply click on the word.

| | |
|---|---|
| Home | Displays the course introduction page |
| FAQs | Displays a list of course related Frequently Asked Questions and answers |
| Glossary | Displays an alphabetical list of course related terms and their definitions |
| Course Map | Displays a hypertext list (Table of Contents) of all subject pages |
| Help | Displays a list of additional sources for help on the course |

Side Bar
The course may also have a side bar that has a list of links to the various chapters in the course. You can click on these links to get to the first page of the specific chapter. The sidebar may also have the following buttons which are used for bookmarking:

| | |
|---|---|
| Save | Stores the center-section page you are currently viewing so that you can return to it at some future time. This bookmark is remembered even if you restart your computer. |
| Go To | Once you have used the Save button, you can reload the bookmarked page by pressing this button. |

Moving About
Any time you see text that is underlined and in color, you can click it and jump directly to another page of information. This is known as hypertext. You can also click certain graphics, known as hyperlinks or hot links to access other resources. How do you know which images are links? Watch the cursor. When you move it over hypertext or a hyperlinked graphic, the cursor changes from an arrow to a hand.

To continue to the next page, click the Next button

To return to the previous page, click the Back button
You can also use your browser's Back button to return to the previous page.

Printing
You may prefer to read long articles on paper, rather than on your computer monitor. To print articles from this course, first click once on the article, then click your web browser's Print button.

Ready to continue? Click Here to start learning.

Figure 9B

SYSTEM, METHOD AND ARTICLE OF MANUFACTURE FOR AN INCREMENTAL EXPLANATORY OBJECT IN A LEARNING APPLICATION ASSEMBLY FRAMEWORK

FIELD OF THE INVENTION

The present invention relates to learning software and more particularly to software for generating learning-oriented application programs.

BACKGROUND OF THE INVENTION

In the past, computer assisted instructional systems have only haphazardly exploited the potential of client-sever systems and networking technologies. Client-sever architectures have emerged as the principal architecture of distributed computer systems. Client systems, running under sophisticated windowing operating systems, can support advanced object based software applications, including high speed graphics, animation and audio output. Servers can store gigabytes of data and programs at central or distributed locations at quite reasonable cost. Object oriented database systems have been developed to store structured data on servers.

Client systems, in a striking change from only several years ago, now virtually all have multimedia capabilities, including high quality graphics, sound, and at least limited video playback capability. Text-to-speech software is presently available for use with these systems, and speech recognition software is on brink of widespread commercial acceptability on low cost platforms. New authoring tools support graphical methods for generation of multimedia presentations and computer based instructional materials having corresponding sequencing logic.

Clients and servers can be linked remotely with increasing convenience and decreasing cost. The Internet has emerged as a means of providing an inexpensive means of connecting computers to provide effective communications and access to information and other resources such as software. Further Internet developments that made the Internet truly universal include the HTML and the HTTP protocols, which provide platform independent access to hyperlinked multimedia information, and the Java.TM. programming language, which provides platform independent software for Internet applications programming. Subsets of the Internet—intranets—have become an increasingly important means for disseminating information and enabling communication within constrained domains, such as a single school system or corporate enterprise.

SUMMARY OF THE INVENTION

A system, method and article of manufacture are provided for generating an incremental explanatory object in an educational application program. First, at least one interface is provided including a plurality of fields. Educational textual information is then entered via the interface for entry into the fields. During operation, the user is permitted to select an incremental explanatory icon on the interface. Upon the selection of the incremental explanatory icon, a plurality of sequential fields are shown. Thereafter, the user is prompted to enter educational textual information for entry into the sequential fields. The received textual information is subsequently compiled in an executable educational application program.

In one aspect of the present invention, the number of the sequential fields are selectable by the user. Further, the executable educational application program is adapted to display contents of the sequential fields in response to a user action. As an option, the contents of the sequential fields are concealed until the receipt of a user action. Prior to the application program being compiled, the contents of the sequential fields may be displayed on the interface.

BRIEF DESCRIPTION OF THE DRAWINGS

The foregoing and the other objects, aspects and advantage are better understood from the following detailed description of a preferred embodiment of the invention with reference to the drawings, in which:

FIGS. 9A and 9B show examples of "how-to-use" interface pages in accordance with one embodiment of the present invention;

DERAILED DESCRIPTION OF THE PREFERRED EMBODIMENT

Figure 1:
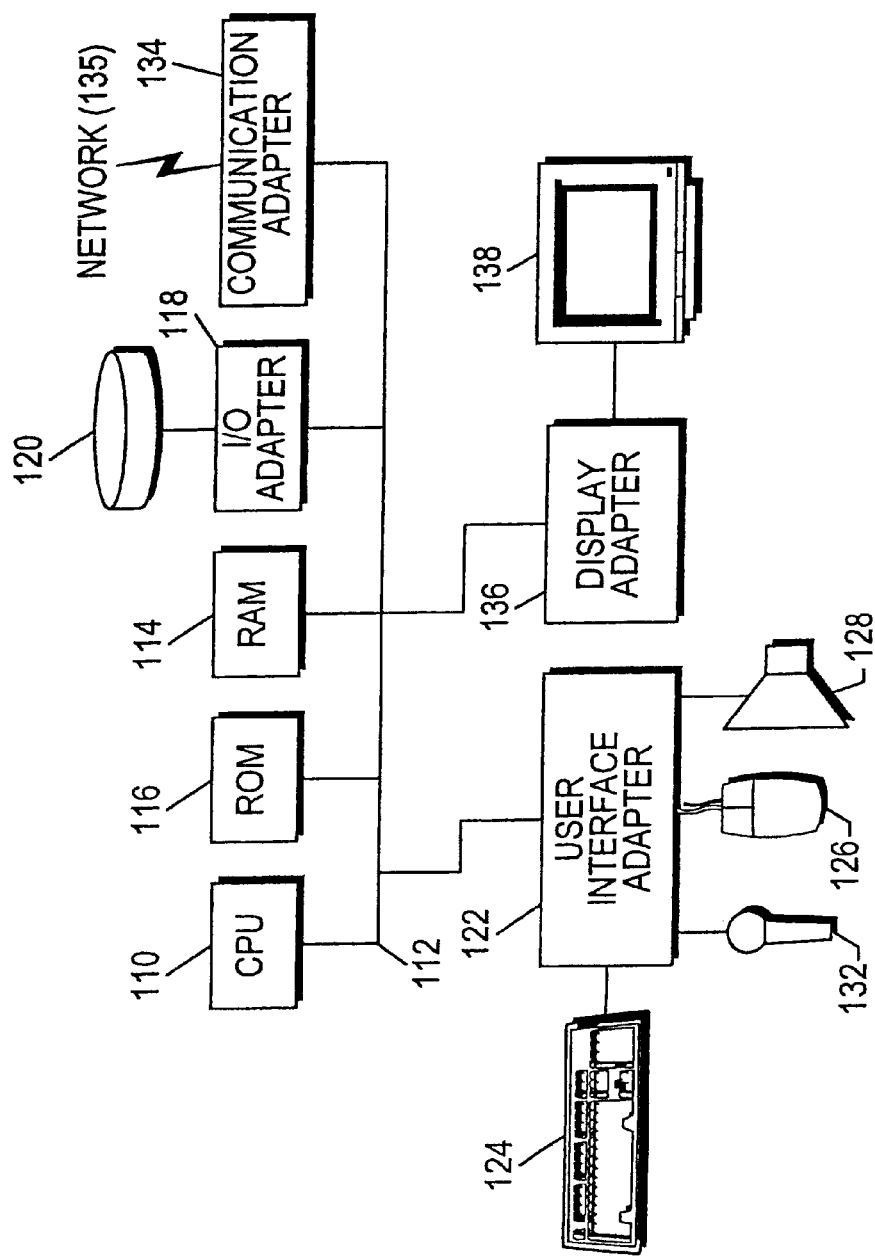
FIG. 1 illustrates one exemplary hardware configuration of a workstation that may be used in accordance with one embodiment of the present invention.

In accordance with at least on embodiment of the present invention, software is provided for generating learning-oriented software in a convenient manner. The software may be executed on a hardware implementation such as is illustrated in FIG. 1. Further, various functional and user interface features of the present invention may be enable using software programming, i.e. object oriented programming (OOP).

Hardware Overview

A representative hardware environment of a preferred embodiment of the present invention is depicted in FIG. 1, which illustrated a typical hardware configuration of a workstation having a central processing unit 110, such as a microprocessor, and a number of other units interconnected via a system bus 112. The workstation show in FIG. 1 includes Random Access Memory (RAM) 114, Read Only Memory (ROM) 116, an I/O adapter 118 for connecting peripheral devices such as disk storage units 120 to the bus 112, a user interface adapter 122 for connecting a keyboard 124, a mouse 126, a speaker 128, a microphone 132, and/or other user interface device such as a touch screen (not shown) on bus 112, communication adapter 134 for connecting the workstation to a communication network (e.g., a data processing network) and a display adapter 136 for connecting the bus 112 to a display service 138. The workstation typically has resident thereon an operating system such as the Microsoft Windows NT or Windows/95 Operating System (OS), the IBM OS/2 operating system, the MAC OS, or UNIX operating system.

Software Overview

Object oriented programming (OOP) has become increasingly used to develop complex applications. As OOP moves toward the mainstream of software design and development, various software solutions require adaptation to make use of the benefits of OOP. A need exists for the principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each other's capabilities or functions. This generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two object, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of pistons engines have different characteristics, but may have the same underlying functions associated with them (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, the logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represents elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable object, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increase in the speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and system-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of objects classed can be summarized, as follows:

Objects and their corresponding classed break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classed can become extremely confusing, with may dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solution to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer call libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts the programmer's code according to actions that the user performs. The programmer no longer determines the order in which events occur. Instead, a program is divided into separate piece that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making all these things work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write form scratch. However, because the framework is really a generic application that displays windows, supports copy and paste, and so on, the programmer can also relinquish control to a greater degree that event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex system that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes codes that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and a company. HTTP or other protocols could be readily substituted for HTML without undue experimentation. Information on these products is available in T. Berners-Lee, D. Connoly, "RFC 1866: Hypertext Markup Language—2.0" November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystem's Java language solves many of the client-side problems by:

Improving performance on the client side;

Enabling the creation of dynamic, real-time Web applications; and

Providing the ability to create a wide variety of user interface components.

With Java developers can create robust User Interface (UI) components. Custom "widgets" (e.g., real-time stock tickers, animated icons, etc.) can be created, and client-side performance is improved. Unlike HTML, Java supports the notion of client-sided validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as "a simple, object-oriented, distributed, interpreted, robust, secure, architecture-neutral, portable, high-performance, multithreaded, dynamic, buzzword-complaint, general-purpose programming language. Java supports programming for the Internet in the form of platform-independent Java applets." Java applets are small, specialized applications that comply with Sun's Java Application Programming Interface (API) allowing developers to add "interactive content"0 to Web documents (e.g., simple animations, page adornments, basic games, etc.). Applets execute within a Java-compatible browser (e.g., Netscape Navigator) by copy code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, which are fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

Preferred Embodiment

Figure 2:
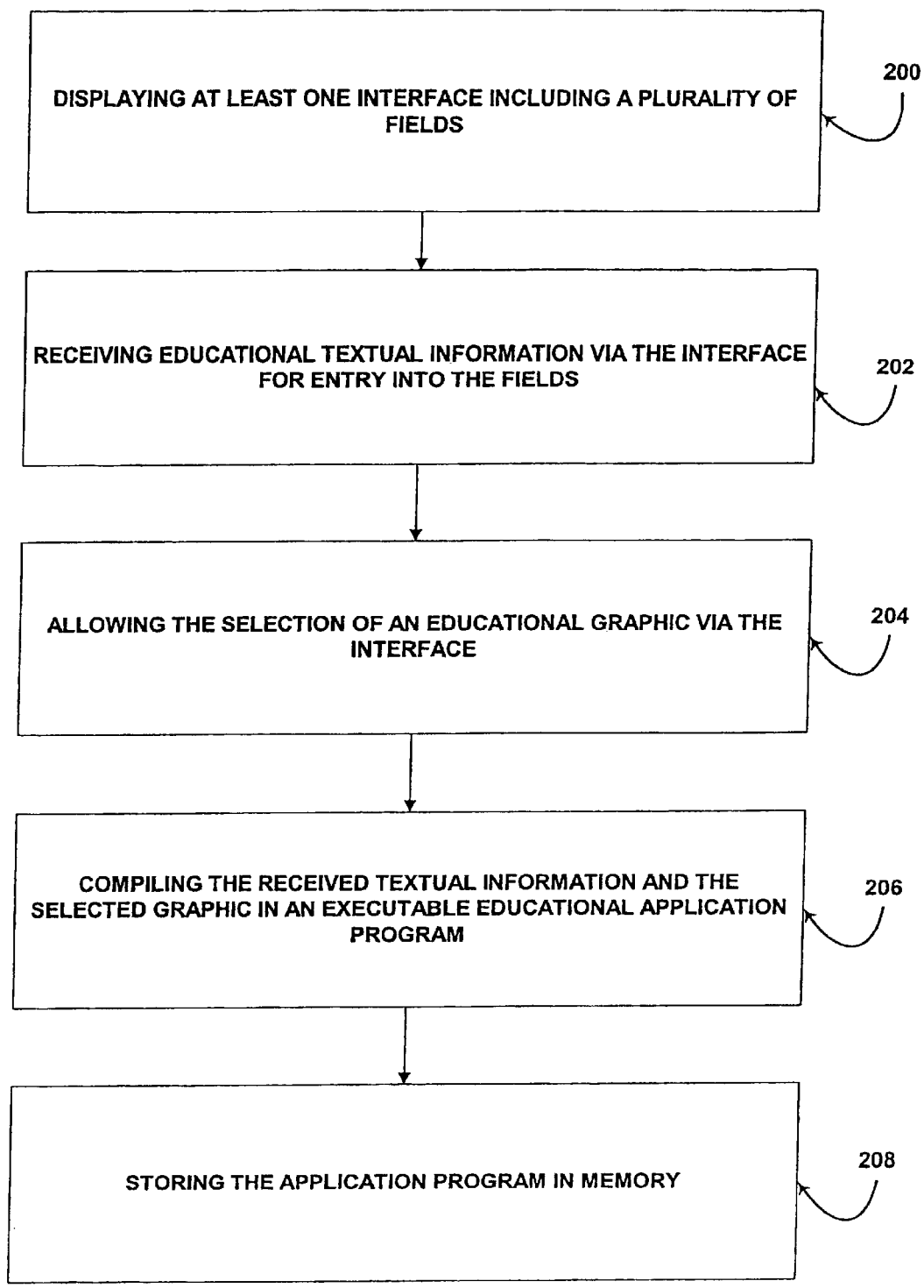
FIG. 2 is a flowchart illustrating a method for generating an educational application program in accordance with one embodiment of the present invention.

FIG. 2 illustrates a method for generating an educational application program. At least one interface is first displayed in operation 200. Such interface includes a plurality of fields. Educational textual information is then received via the interface for entry into the fields. Note operation 202.

During generation of the educational application program, the user may select an educational graphic via the interface in operation 204. Thereafter, the received textual information and the selected graphic are complied in an executable educational application program in operation 206 which is subsequently stored in memory in operation 208. When compiling, the executable application program may be written in Hypertext Markup Language (HTML) for execution over a wide area network such as the Internet.

Figure 3:
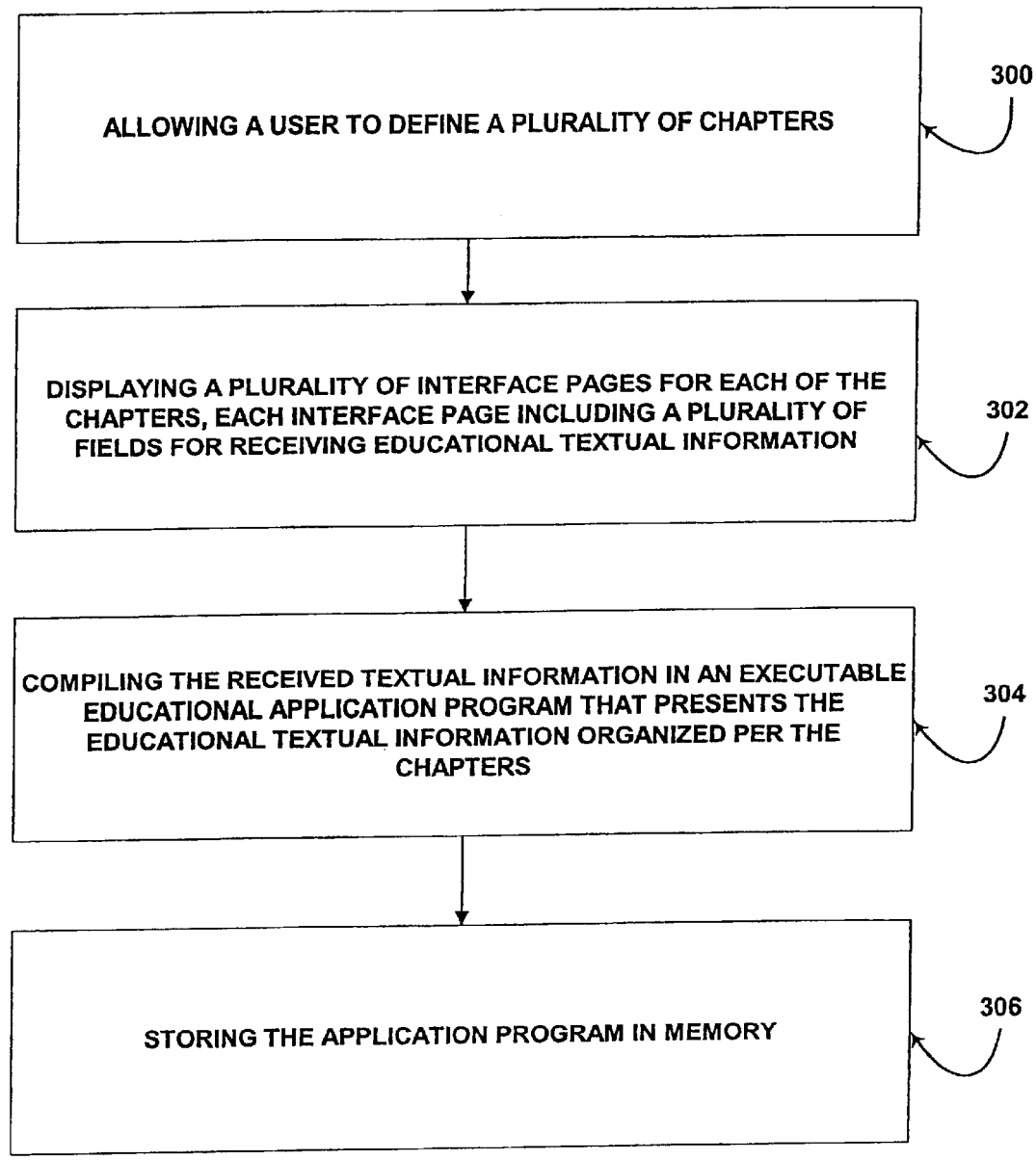
FIG. 3 is a flowchart illustrated an exemplary of organizing the information input during the generation of the educational application program in accordance with one embodiment of the present invention.

FIG. 3 is a flowchart illustrating an exemplary method of organizing the information input during the generation of the educational application program. As shown, a user is permitted to define a plurality of chapters in operation 300. Thereafter, in operation 302, a plurality of interface pages are displayed for each of the chapters.

Each interface page includes a plurality of fields for receiving educational textual information. Upon receipt, the textual information may be compiled in an executable educational application program that presents the educational textual information organized per the chapters. Note operation 304. Such application program may be stored in memory for subsequent execution, as indicated in operation 306.

Figure 4:
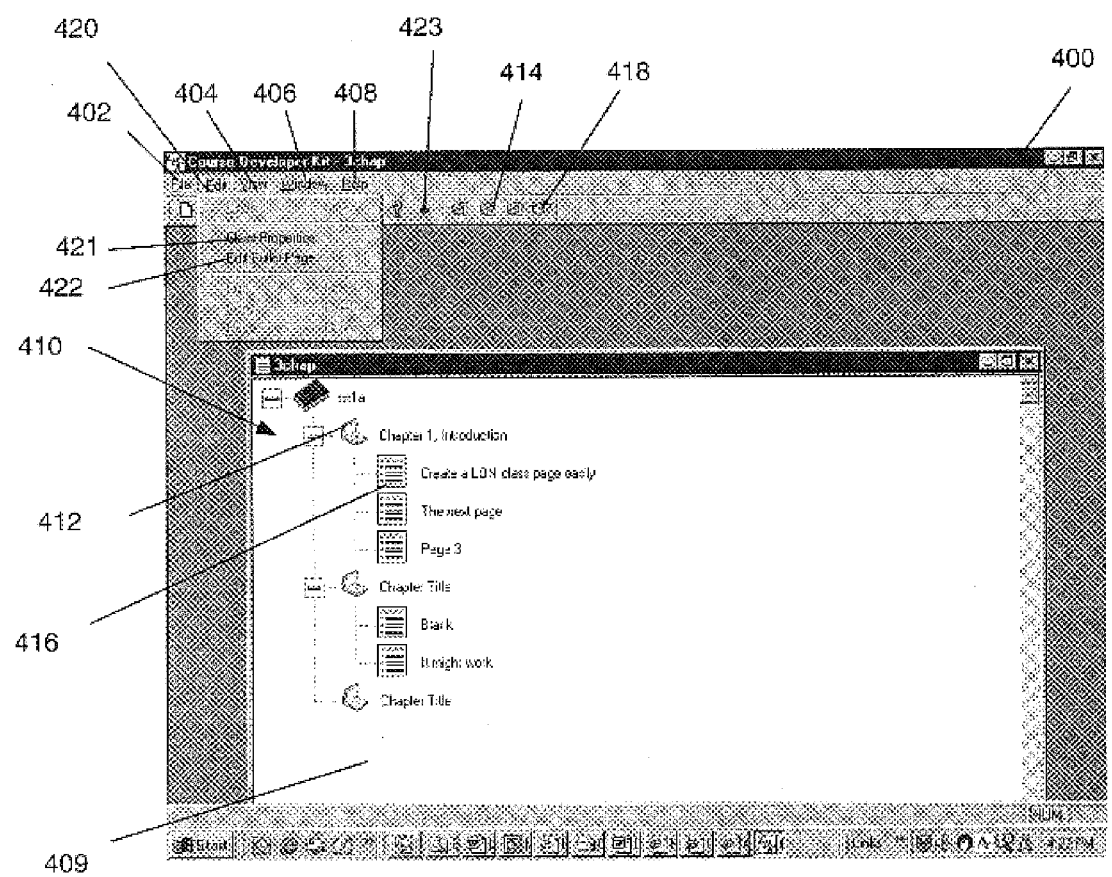
FIG. 4 illustrates a graphical user interface for carrying out the method of FIG. 3 in accordance with one embodiment of the present invention.

FIG. 4 illustrates a graphic user interface for carrying out the method of FIG. 3. As shown, a frame 400 is provided with a File menu 402, a View menu 404, a Window menu 406, and a Help menu 408 which are each commonly known to those of ordinary skill in the art. Inside the frame 400 is a data structure page 409 may be depicted showing the organization of the chapters and the interface pages in a tree-like structure 410. Such structure includes a plurality of chapter icons 412. Upon clicking on the chapter icons 412, a plurality of interface page icons 416 are shown that are representative of separate interface pages. Additional information regarding the interface pages will be set forth hereinafter in greater detail.

The frame 400 of FIG. 4 includes an add chapter icon 418 for adding additional chapters and associated chapter icons 412. Also included are edit icons 414 which allow editing of the contents of each of the particular chapters. Such editing may be similarly effected via an Edit menu 420 and selection of an "Edit Bullet Page" option 422. Also under the Edit menu 420 is a "Class Properties" option 421 which allows the entry of general information such as a course name, company name, course title, course summary, and a side bar color which may be integrated upon execution of the final software program product. After editing is complete, the application program may be compiled by selecting a compile icon 423.

Figure 5:
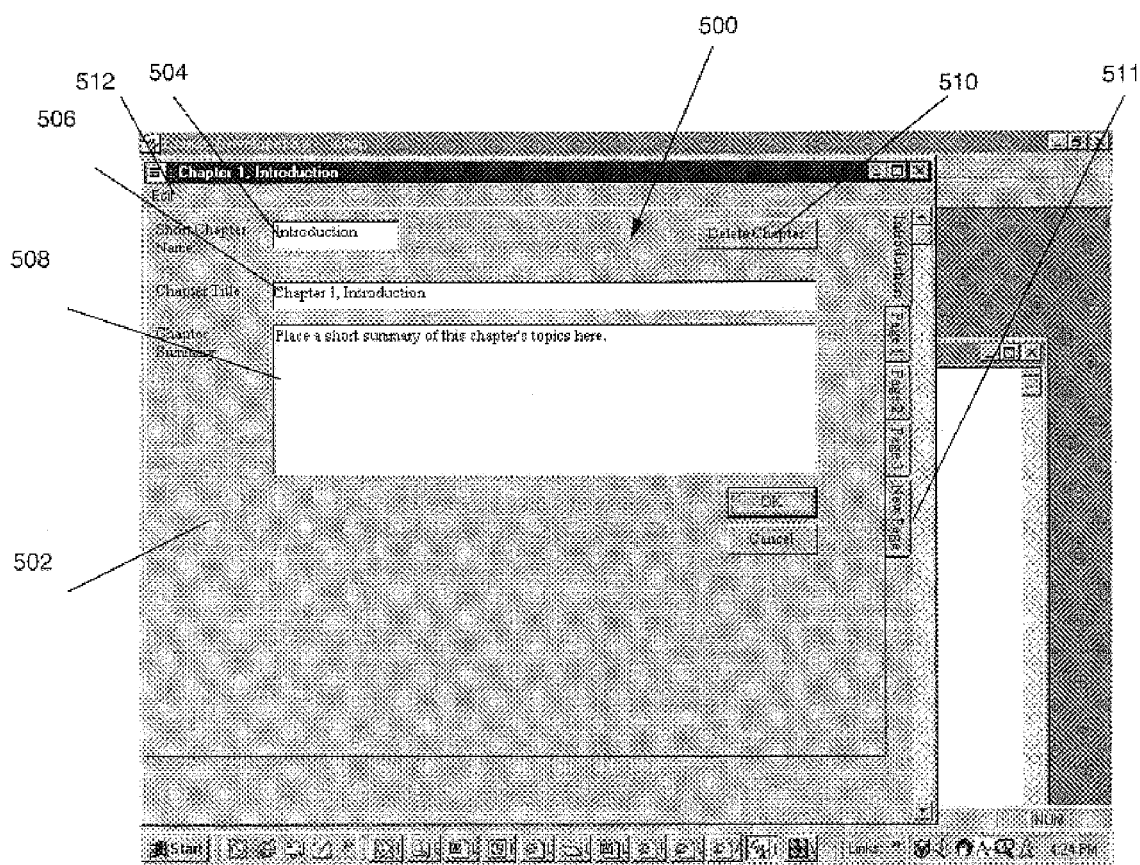
FIG. 5 illustrates an edit window for editing the chapter interface of the educational application program generated by the present invention.

FIG. 5 illustrates an edit window 500 which appears upon the selection of one of the chapter edit icons 414, or the placement of a cursor on one of the chapter icons 412 or interface page icons 416 with the subsequent selection of the "Edit Bullet page" option 422 of the Edit menu 420.

As shown, a chapter interface 502 is shown in the edit window 500. The chapter interface 502 includes a plurality of fields. Identification textual information may be received via the chapter interface 502 for entry into the fields. Such identification textual information is subsequently compiled in the executable educational application program. The fields of the chapter interface may include a chapter name field 504, a chapter title field 506, and a chapter summary field 508.

As an option, a delete chapter icon 510 and an addition chapter icon 511 may be included on the chapter interface 502 for allowing the deletion and addition of a chapter and associated interface pages, respectively. Further, an auxiliary Edit menu 512 may be employed to execute conventional cut, copy and paste operations. As will soon become apparent, such identification textual information is then complied in the executable educational application program.

Figure 6:
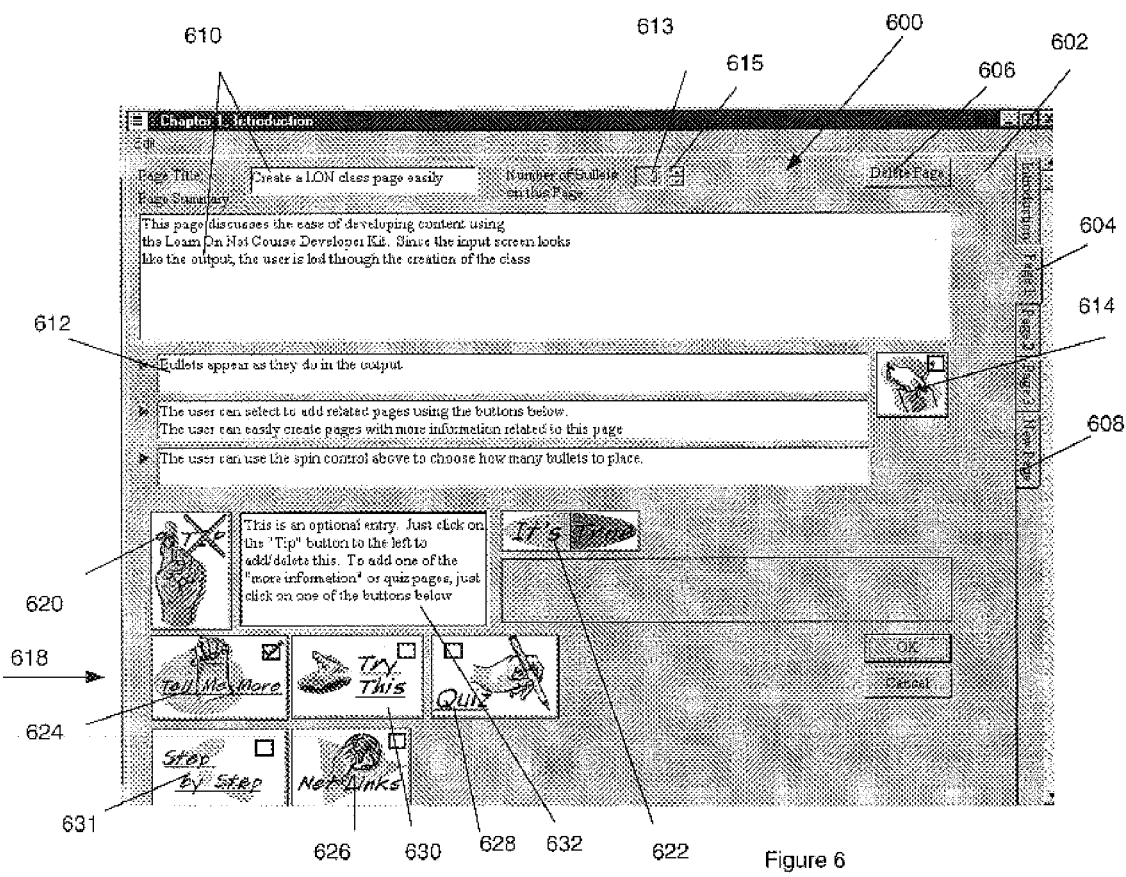
FIG. 6 illustrates a graphical user interface for generating an interface page in an educational application program in accordance with one embodiment of the present invention.

FIG. 6 illustrates a graphical user interface 600 for generating an interface page in an educational application program. Such interface page is one of a plurality of interface pages associated with the corresponding chapter. Additional details regarding the exact nature of the execution of the interface pages will be set forth hereinafter in greater detail. Multiple windows 602 of the graphical user interface 600 may be overlaid and accessed by selecting a plurality of tabs 604. As an option, the user may be allowed to delete and add one or more of the interface pages using a delete page icon 606 and a new page icon 608, respectively.

Each window 602 of the graphical user interface 600 includes header fields 610 that are displayed for receiving textual information from a user. Such header fields 610 may include a title field and a summary field.

An information field 612 is also presented for receiving textual information related to the textual information received in the header fields 610. In one embodiment of the present invention, a plurality of the information fields 612 are shown in a bulleted format. In use, the number of bulleted information fields that are currently displayed is identified in window 613, and may be added or deleted by arrows 615.

Figure 6A:
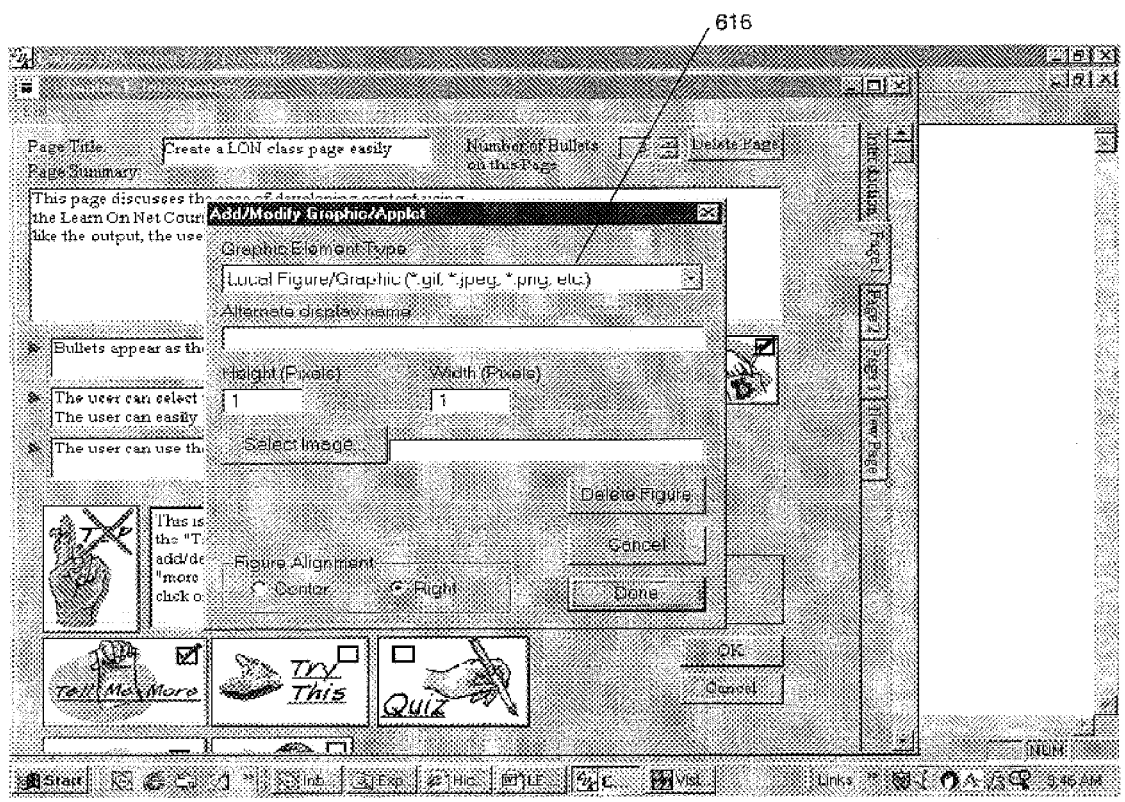
FIG. 6A illustrates a graphical user interface which permits selection of a graphic file in any desired format.

The user is permitted to select an icon 614 for picking an educational graphic for inclusion in the application program that is being generated. FIG. 6A illustrates the graphical user interface 616 which permits selection of a graphic file in any desired format. It should be noted that the size and the alignment of the graphic may also be manipulated by the user via graphical user interface 616.

Also depicted in each window 602 of the graphical user interface 600 is a plurality of education functional modules 618 for allowing the entry of textual information by the user. As an option, the functional modules may include a tip module 620, a fact module 622, an additional information module 624, a link module 626, a quiz module 628, an interactive simulation module 630, and a step-by-step module 631. Such function modules manipulate the text for presentation in the application program.

Upon selection of the tip module 620, fact module 622 or the additional information module 624, a sub-window 632 is shown in the window 602 of the graphical user interface 600. Textual information may be subsequently entered into the sub-window 632. As will become apparent later, such information is displayed in an interface page or a pop-up window when the application program is executed and an associated icon is selected.

Figure 7:
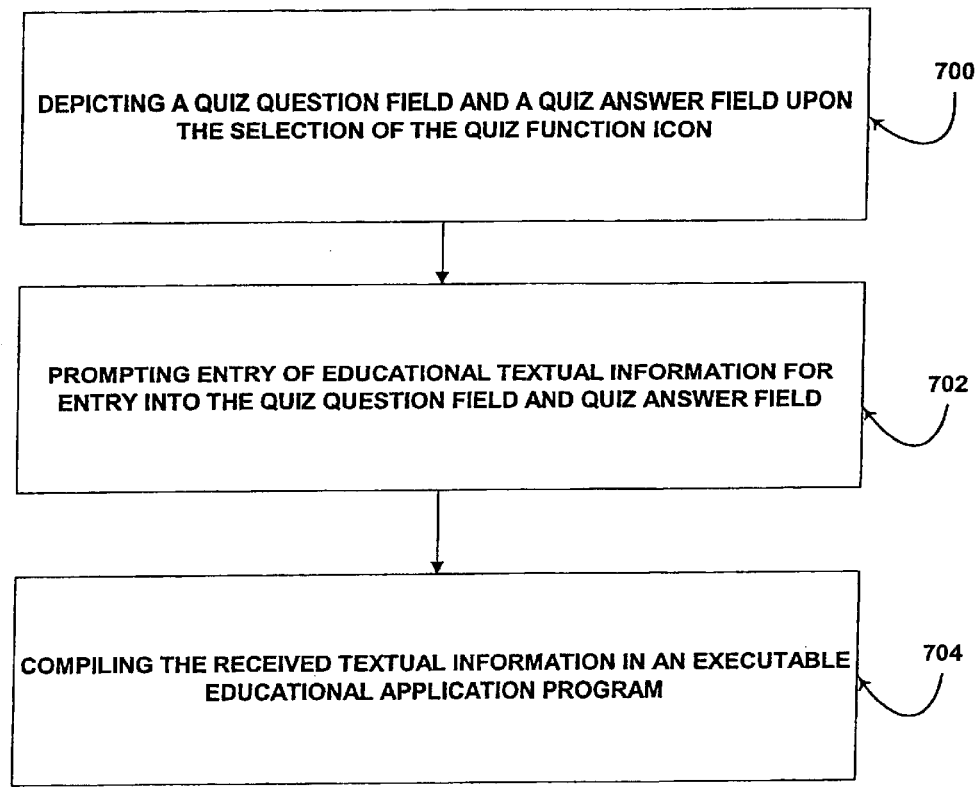
FIG. 7 is a flowchart illustrating a method for generating a quiz function in an educational application program in accordance with one embodiment of the present invention.

FIG. 7 is a flowchart illustrating a method for generating a quiz function in an educational application program upon selection of the quiz module 628. Upon selection of the quiz module 628, the depiction of a quiz question field and a quiz answer field is prompted in operation 700. Next in operation 702, the user is prompted to enter educational textual information into the quiz question field and quiz answer field. Thereafter, the received textual information is compiled in an executable educational application program in operation 704. As an option, a plurality of quiz multiple choice answer fields may be displayed for entry of textual information. Further, the contents of the quiz question field and the quiz answer field may be constantly displayed on the interface in the window 602 of the graphical user interface 600, or in a pop-up window.

Figure 8:
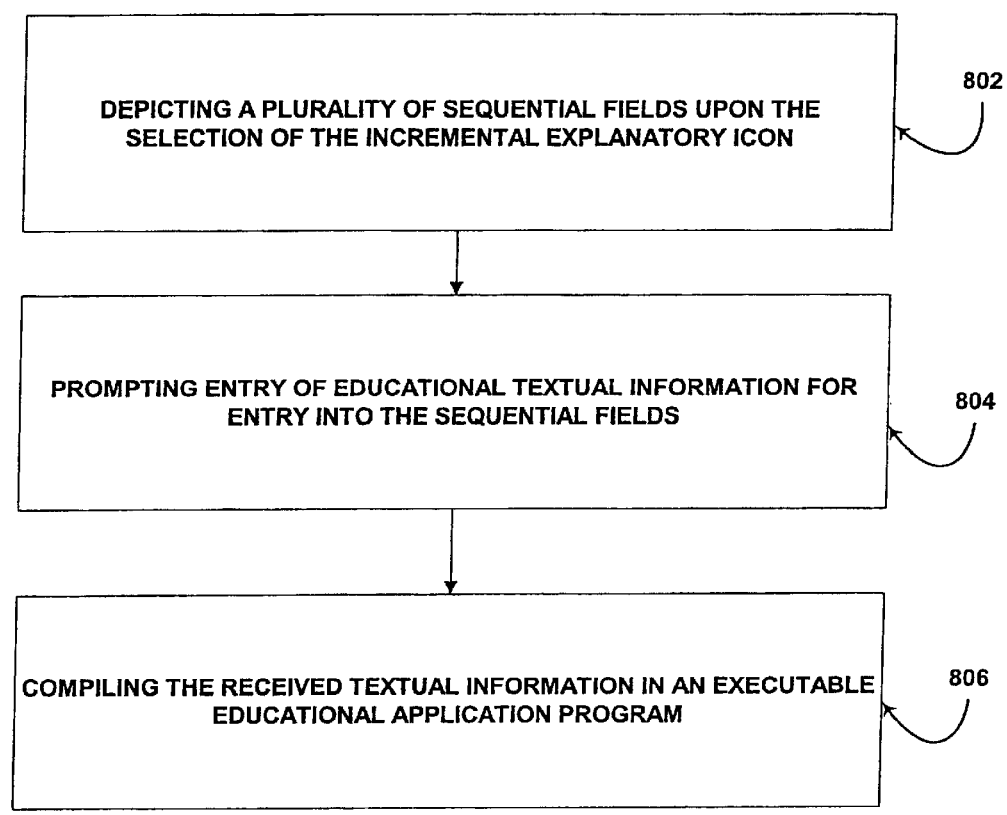
FIG 8. is a flowchart illustrating a method for generating a step-by-step function in an educational application program in accordance with one embodiment of the present invention.

FIG. 8 is a flowchart illustrating a method for generating a step-by-step function, or incremental explanatory operation, in an educational application program upon selection of the step-by-step module 631. In operation, the user is permitted to select an incremental explanatory icon on the interface. Upon the selection of the incremental explanatory icon, a plurality of sequential fields are shown 802. Thereafter, the user is prompted to enter educational textual information for entry into the sequential fields in operation 804. The received textual information is subsequently compiled in an executable educational application program. Note operation 806. As an option, the number of the sequential fields are selectable by the user.

Figure 9:
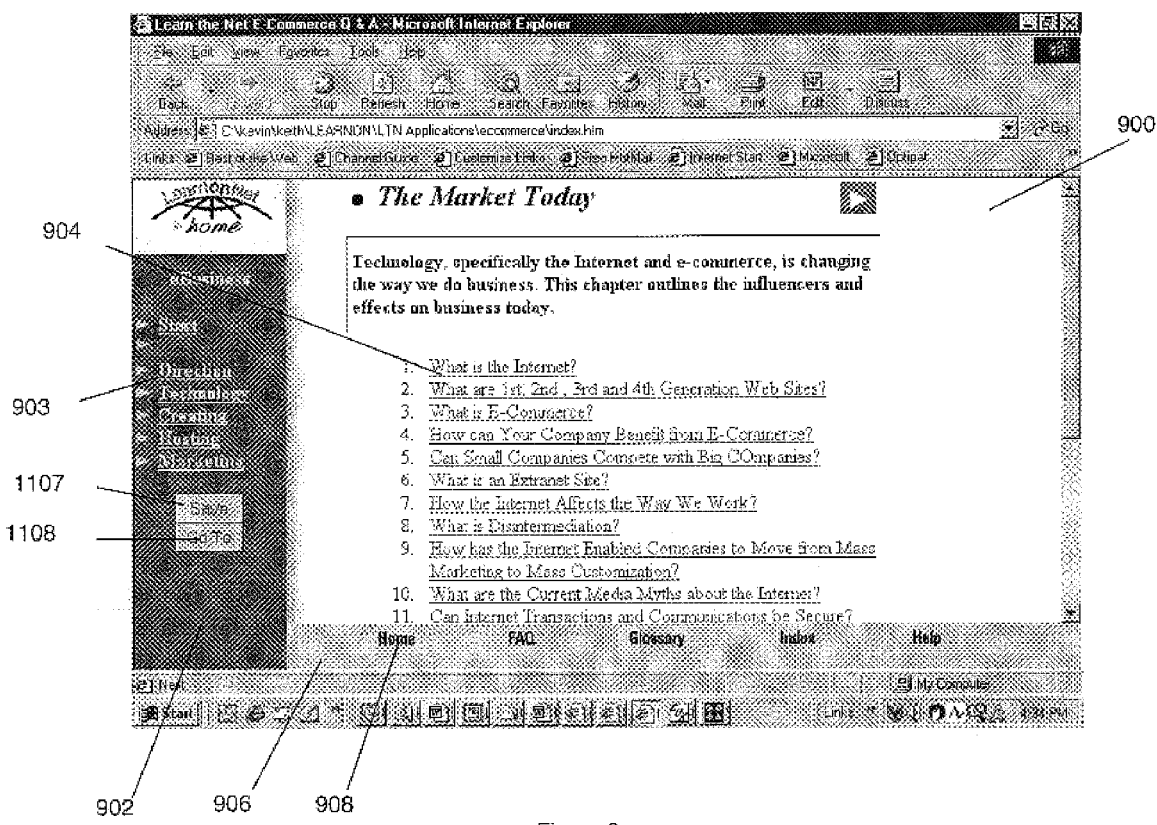
FIG. 9 illustrates the application program executed on a network browser in accordance with one embodiment of the present invention.

FIG. 9 illustrates the application program executed on a network browser such as Netscape Communicator, Microsoft Explorer, etc. In order to generate an application program that is capable of being run by the computer, the application program may be compiled by selecting the compile icon 423 of FIG. 4. This generates an executable file written in HTML.

As shown in FIG.9, a first frame 900 is included for displaying a plurality of interface pages each having education information. Such interface pages are organized into chapters,a s set forth earlier. Associated therewith is a second frame 902 including hyperlinks to the chapters upon selection. A list of hyperlinks 904 to the interface pages of the selected chapter is depicted in the first frame 900 for linking purposes.

Next provided is a third frame 906 including a plurality of hyperlinks 908 for linking to a plurality of resources such as a glossary, an index, a list of questions, and/or help information.

As set forth earlier, the interface pages include functional modules. Such functional modules may include a quiz module, an interactive simulation module, and/or a pop-up window module, etc. Further, one of the chapters includes interface pages for teaching a user how to use the educational software. An example of such "how-to-use" interface pages are shown in FIGS. 9A and 9B.

Figure 10:
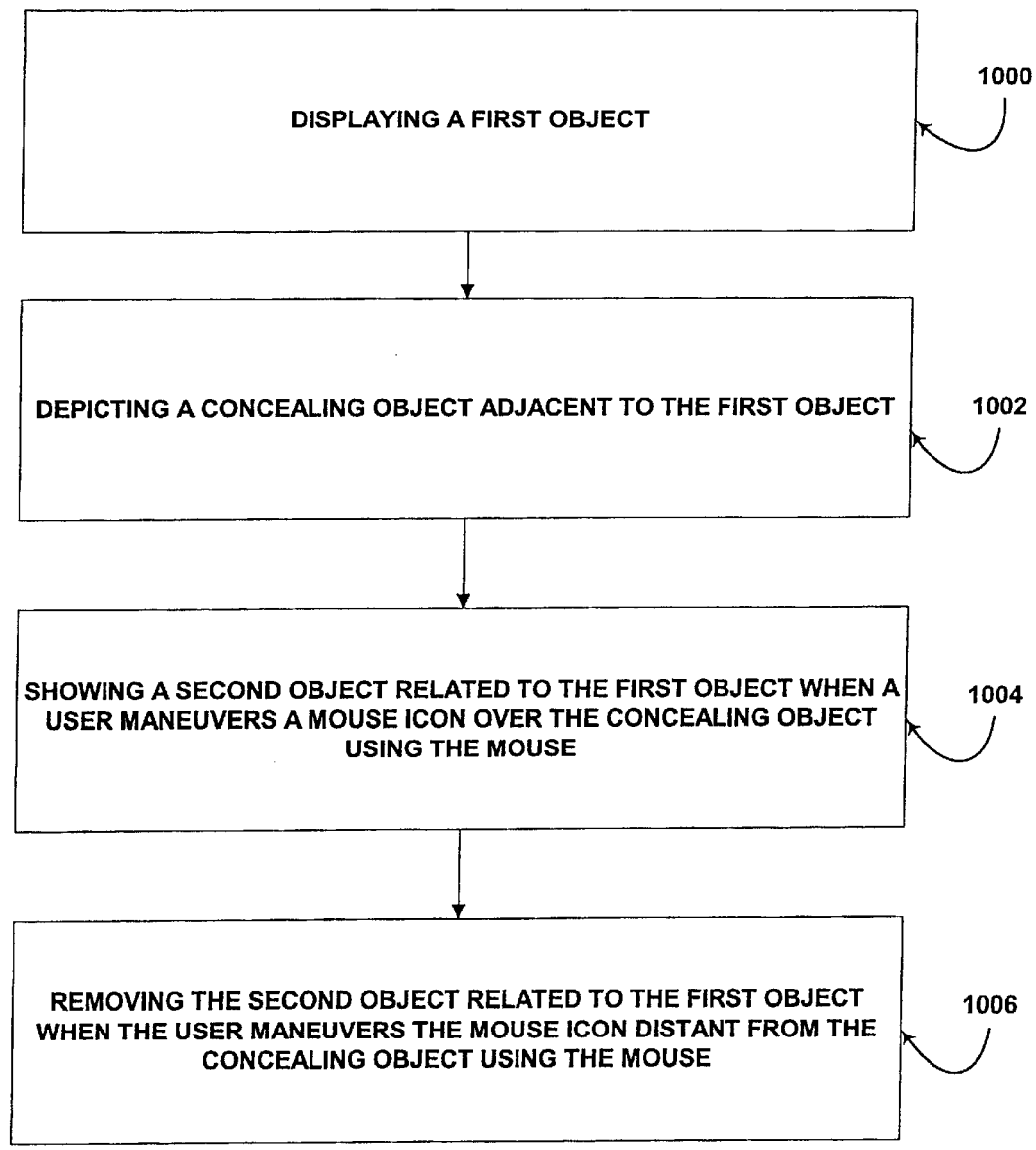
FIG. 10 illustrates a method for revealing and concealing information during use of a software application that is used with a computer having a mouse in accordance with one embodiment of the present invention.

FIG. 10 illustrates a method for revealing and concealing information during use of a software application that is used with a computer having a mouse. In particular, such feature is employed during the execution of the application program that includes a quiz module.

Figure 10A:
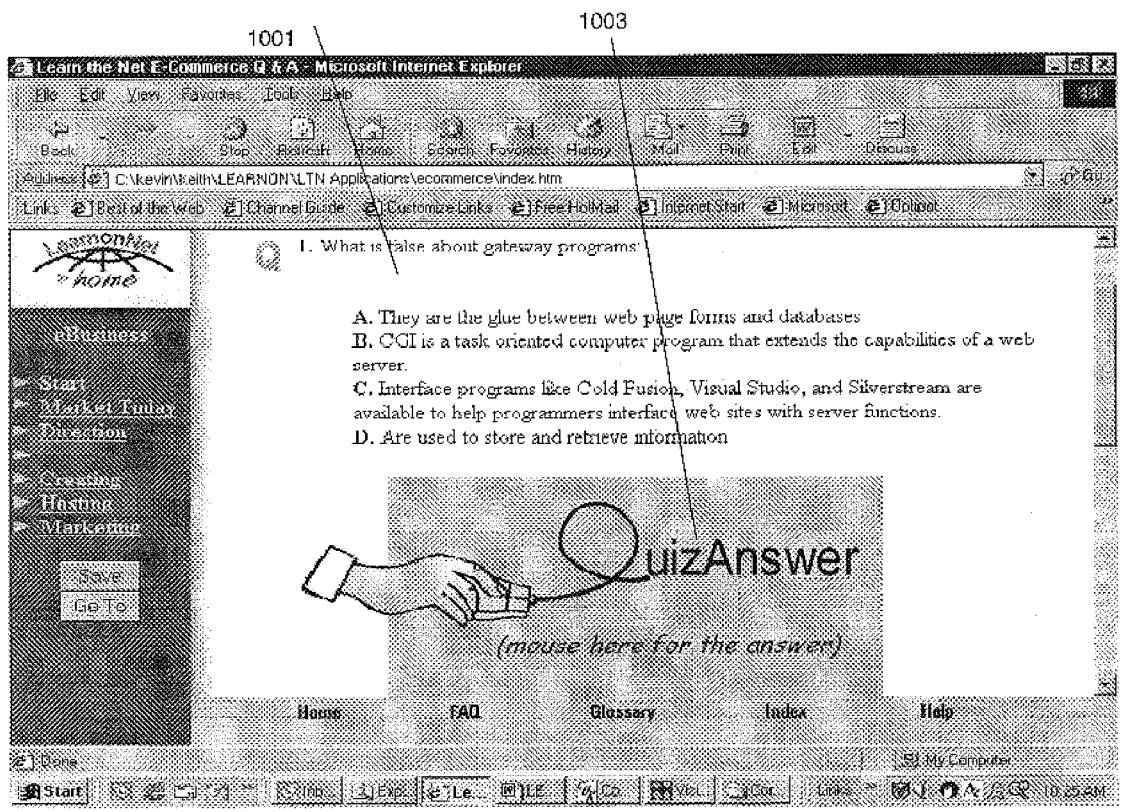
FIG. 10A illustrates a first object and concealing object of the quiz module of the present invention.

First, in operations 1000 and 1002, a first object is displayed along with a concealing object adjacent to the first object. FIG. 10A illustrates the first object 1001 and the concealing object 1003 of the associated interface page.

In operation 1004, a second object related to the first object 1001 is revealed when a user maneuvers a mouse icon over the concealing object 1003 using the mouse. The first object 1001 may include textual information representative of a question, and the second object may be representative of an answer. As an option, the second object replaces the concealing object 1003 when the user maneuvers the mouse icon over the concealing object 1003. Upon the user maneuvering the mouse icon distant from the concealing object 1003, the second object related to the first object 1001 is concealed. Note operation 1006.

Figure 11:
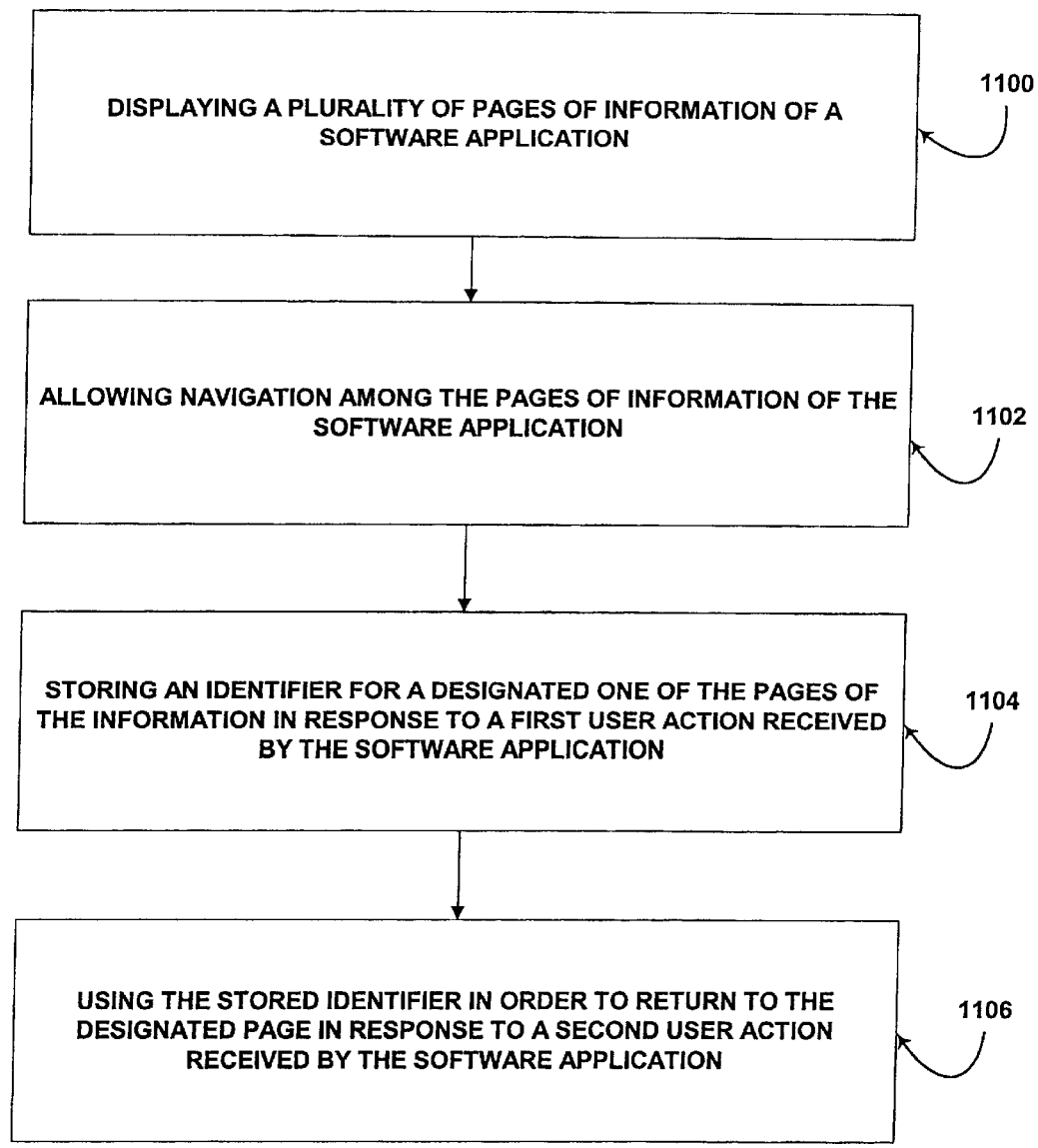
FIG. 11 is a flowchart illustrating a method for returning to a previous location in a software application in accordance with one embodiment of the present invention.

FIG. 11 is a flowchart illustrating a method for returning to a previous location in a software application. First, in operation 1100, a plurality of pages of information of a software application is displayed. During operation, the user is permitted to navigate among the pages of information of the software application, as indicated in operation 1102. In response to a first user action received by the software application, an identifier is stored for a currently viewed page of the information. Note operation 1104. Such stored identifier is subsequently used to return to the designated page in response to a second user action received by the software application, as indicated in operation 1106.

The first user action may include the selection of a first icon 1107 (Note FIG. 9) displayed by the software application. Further, the second user action may include the selection of a second icon 1108 (Note FIG. 9) displayed by the software application. In one embodiment, the first icon and the second icon may be positioned in a first frame separate from a second frame in which the pages of the information are displayed. Further, the first icon may be positioned adjacent to the second icon.

As mentioned earlier, it is preferred that the educational application program be written in HTML. HTML is a system for marking documents to indicate how the document should be displayed, and how various documents should be linked together. HTML has been used extensively to provide documents on the computer communications network known as the Internet. The Internet includes a vast collection of interconnected documents which are stored in computers all over the world in a system known as the World Wide Web (i.e., the Web). The documents are organized into web spaces, where a web space includes a home page and links to other documents which may be in the local web space or in an external web space. Such links are known as hyperlinks. Documents may include moving images, text, graphical displays, and sound.

HTML is a form of Standard Generalized Markup Language (SGML), defined by the International Standards Organization (ISO), reference number ISO 8879:1986. HTML specifies the grammar and syntax of markup tags which are inserted into a data file to define how the data will be presented when read by a computer program known as a browser. The data file, which is typically stored on a Web server, includes one or more Web pages which are visited by users who have computers which may run different browsers. When a page is visited, typically via a telephone connection, HTML data is downloaded to a user's computer. The computer's browser processes the data to format a layout for the page so the page can be viewed by the user on a computer screen.

An SGML document includes three parts. The first part describes the character set, or codes, which are used in the language. The second part defines the document type, and which markup tags are recognized. The third part is known as the document instance and contains the actual text and markup tags. The three parts may be stored in different files. Furthermore, HTML browsers assume that files of different pages contain a common character set and document type, so only the text and markup tags will change for different pages.

The base character set for HTML is Latin-1 (ISO 8859/1), which is an eight-bit alphabet with characters for most American and European languages. The 128-character standard ASCII (ISO 646) is a seven-bit subset of Latin-1. For simplicity and compatibility with different browsers, many Web pages include only an ASCII character set. Furthermore, non-ASCII characters may be defined using sequences of ASCII characters. For example, the character "e" is defined as "è".

HTML characters are enclosed in angled brackets to distinguish them from the page text. The characters may appear alone, or may appear at the start and end of a field of the page text. For example, indicates the start of a new paragraph, while Welcome to my home page indicates the phrase "Welcome to my home page" should be italicized. Generally, HTML tags provide text formatting, hypertext links to other pages, and links to sound and picture elements. HTML tags also define input fields for interactive Web pages.

A hypertext is a database system which provides a unique and non-sequential method of accessing information using nodes and links. Nodes, i.e. documents or files, contain text, graphics, audio, video, animation, images, etc. while links connect the nodes or documents to other nodes or documents. The most popular hypertext or hypermedia system is the World Wide Web, which links various nodes or documents together using hyperlinks, thereby allowing the non-linear organization of text on the web.

A hyperlink is a relationship between two anchors, called the head and the tail of the hyperlink. The head anchor is the destination node or document and the tail anchor is the document or node from which the link begins. On the web, hyperlinks are A hyperlink is a relationship between two anchors, called the head and the tail of the anchor document. When a user reviewing the tail document "clicks on" the highlighted or "anchor-text" material, the hyperlink automatically connects the user's computer with or "points to" the head anchor document for that particular hyperlink.

A hypertext system generally works well when a user has already found a tail document pertaining to the subject matter of interest to that user. The hyperlinks in the tail document are created by the author of the document who generally will have reviewed the material in the head documents of the hyperlinks. Thus, a user clicking on a hyperlink has a high degree of certainty that the material in the head document has some pertinence to the anchor text in the tail document of the hyperlink.

As the popularity of the Internet and the Web has grown, the ability to find relevant documents has become increasingly difficult. If a user is unable to find a first document pertaining to the subject matter of interest, the user will of course not be able to use hyperlinks to find additional pertinent documents. Moreover, the location of a single relevant document may not lead to other documents if the author of the relevant document has not created hyperlinks to other relevant web sites. The proliferation of information has, therefore, lead to the development of various search engines which assist using in finding information. Numerous search engines such as Excite, Infoseek, and Yahoo| are now available to users of the Web.

Search engines usually take a user query as input and attempt to find documents related to that query. Queries are usually in the form of several words which describe the subject matter of interest to the user. Most search engines operate by comparing the query to an index of a document collection in order to determine if the content of one or more of those documents matches the query. Since most casual users of search engines do not want to type in long, specific queries and tend to search on popular topics, there may be thousands of documents that are at least tangentially related to the query. When a search engine has indexed a large document collection, such as the Web, it is particularly likely that a very large number of documents will be found that have some relevance to the query. Most search engines, therefore, output a list of documents to the user where the documents are ranked by their degree of pertinence to the query and/or where documents having a relatively low pertinence are not identified to the user. Thus, the way in which a search engine determines the relevance ranking is extremely important in order to limit the number of documents a user must review to satisfy that user's information needs.

Almost all ranking techniques of search engines depend on the frequency of query terms in a given document. When other related factors are the same, the higher a term's frequency in a given document, the higher the relevance score of this document to a query including that term. Factors other than term frequency, such as such document frequency, i.e. how many documents contain the term, may also be taken into account in determining a relevance score. Once the various factors such as term frequency or document frequency have been determined for a particular query, various models such as the vector space model, probabilistic model, fuzzy logic models, etc. are used to develop a numerical relevance ranking. See, Harman, D., "Ranking Algorithms," Chapter 14, Information Retrieval, (Prentice Hall, 1992).

For instance, in the vector space model, a user query Q is represented as a vector where each query term (qt) is represented as a dimension of a query vector.

Q=

Documents in the database are also represented by vectors with each term or key word (dt) in the document represented as a dimension in the vector.

Q=

The relevance score is then calculated as the dot product of Q and D.

The calculation of the value of each dimension for vectors Q or D may be weighted in a variety of ways. The most popular term-weighting formula is:

$$\text{Weight}(t) = TF * IDF.sub.t$$

where TF is the term frequency of a given term in a document or query, and IDF.sub.t is the inverse document frequency of the term. The inverse document frequency is the inversion of how many documents in the whole document collection contain the term, i.e.: ##EQU1## Using inverse document frequency insure that junck words such as "the," "of," "as," etc. do not have a high weight. In addition, when a query uses multiple terms, and one of those terms appears in many documents, using an IDF weighting gives a lower ranking to documents containing that term, and a higher ranking to document containing other terms in the query.

There are normalized versions of term weighting, which take into account the length of a document including a particular term. The assumption made is that the more frequently a term appears in a document for a given amount of text, the more likely that document is relevant to a query including that term. That assumption may not be true, however, in many cases. For example, if the query is "Java tutorial," a document (call it J), which contains 100 lines with each line consisting of just the phrase "Java tutorial," would get a very high relevance score and would be output by a search engine as on of the most relevant documents to the user. That document, however, would be useless to the user since it provides no information about a "Java tutorial." What the user really needs is a good tutorial for the Java programming language such as found on Sun's Java tutorial site (http://Java.sun.com/tutorial). Unfortunately, the phrase "Java tutorial" does not occur 100 times on Sun's site, and therefore most search engines would incorrectly find Sun's site to be less pertinent, and thus have a lower relevance ranking, than Document J.

Documents such as Document J might not be included in a traditional database because each document in a traditional database is selected or authored for its content rather than the repetition of certain key words. On the Web, where anyone can be a publisher, there is no one to select or screen out document such as J. In fact, some people intentionally draft their documents so that the documents will be retrieved on the top of a ranked list output by search engines that take into account term frequency or normalized term frequency. For instance, a Web site may be designed so that the text for the first five lines includes the work "sex." The Web site may be of low quality or have nothing to do with sex, but a search engine can be fooled into ranking the site highly because of the high frequency of the word "sex" in the site.

Length normalization may also have other problems in a hypertext environment. Documents containing media other than text may make it difficult to accurately calculate the relevant length of a document.

Traditional search engines using key words also may not retrieve relevant documents containing synonyms of those key words. Thus, many search engines may need an extensive thesaurus, which may be too expensive or difficult to build, in order to find a document containing the word "attorney" when the user includes only the word "lawyer" in a query. Traditional search engines also cannot find relevant documents which are in a language other than the language of the query entered by the search engine user. Translation tools are a possible solution, but they may be difficult and expensive to build.

In addition, traditional search engines may be unable to identify non-textual material which is relevant to a query. For instance, a Web site containing pictures of Mozart or examples of Mozart's music may not be deemed relevant by a search engine when that search engine can only search for the word "Mozart" within the text of documents.

Although only a few embodiments of the present invention have been described in detail herein, it should be understood that the present invention may be embodied in many other specific forms without departing from the spirit or scope of the invention. In particular, some of the above-described embodiments have been directed towards acquiring and selecting personnel for placement in the Information Technology field. However, such embodiments would perform equally well for acquiring and selecting personnel for placement in other fields unrelated to IT. Therefore, the present examples and embodiments are to be considered as illustrative and not restrictive, and the invention is not to be limited to the details given herein, but may be modified within the scope of the appended claims.

What is claimed is:

1. A method for generating an incremental explanatory object in an educational application program, comprising the steps of:
   (a) displaying at least one interface including a plurality of fields;
   (b) receiving educational textual information via the interface for entry into the fields;
   (c) allowing the selection of an incremental explanatory icon on the interface;
   (d) depicting a plurality of sequential fields upon the selection of the incremental explanatory icon;
   (e) prompting entry of educational textual information for entry into the sequential fields; and
   (f) compiling the received textual information in an executable educational application program.

2. A method as recited in claim 1, and further comprising the step of allowing the selection of the number of the sequential fields by the user.

3. A method as recited in claim 1, wherein the executable educational application program is adapted to display contents of the sequential fields in response to a user action.

4. A method as recited in claim 3, wherein the contents of the sequential fields are concealed until a user action.

5. A method as recited in claim 1, wherein the contents of the sequential fields are displayed on the interface.

6. A computer program embodied on a computer readable medium for generating an incremental explanatory object in an educational application program, comprising:
   (a) a code segment for displaying at least one interface including a plurality of fields;
   (b) a code segment for receiving educational textual information via the interface for entry into the fields;
   (c) a code segment for allowing the selection of an incremental explanatory icon on the interface;
   (d) a code segment for depicting a plurality of sequential fields upon the selection of the incremental explanatory icon;
   (e) a code segment for prompting entry of educational textual information for entry into the sequential fields; and
   (f) a code segment for compiling the received textual information in an executable educational application program.

7. A computer program as recited in claim 6, and further comprising a code segment for allowing the selection of the number of the sequential fields by the user.

8. A computer program as recited in claim 6, wherein the executable educational application program is adapted to display contents of the sequential fields in response to a user action.

9. A computer program as recited in claim 8, wherein the contents of the sequential fields are concealed until a user action.

10. A computer program as recited in claim 6, wherein the contents of the sequential fields are displayed on the interface.

11. A system for generating an incremental explanatory object in an educational application program, comprising:
   (a) logic for displaying at least on interface including a plurality of fields;
   (b) logic for receiving educational textual information via the interface for entry into the fields;
   (c) logic for allowing the selection of an incremental explanatory icon on the interface;
   (d) logic for depicting a plurality of sequential fields upon the selection of the incremental explanatory icon;
   (e) logic for prompting entry of educational textual information for entry into the sequential fields; and
   (f) logic for compiling the received textual information in an executable educational application program.

12. A system as recited in claim 11, and further comprising logic for allowing the selection of the number of the sequential fields by the user.

13. A system as recited in claim 11, wherein the executable educational application program is adapted to display contents of the sequential fields in response to a user action.

14. A system as recited in claim 13, wherein the contents of the sequential fields are concealed until a user action.

15. A system as recited in claim 11, wherein the contents of the sequential fields are displayed on the interface.

* * * * *